(12) United States Patent
Liang et al.

(10) Patent No.: US 12,033,678 B2
(45) Date of Patent: Jul. 9, 2024

(54) CABLE BONDING PROTECTION FOR HEAD DIMENSIONAL STABILITY

(71) Applicant: International Business Machines Corporation, Armonk, NY (US)

(72) Inventors: Jason Liang, Campbell, CA (US); Hoodin Hamidi, San Francisco, CA (US); Daniel Brown, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 17/476,720

(22) Filed: Sep. 16, 2021

(65) Prior Publication Data

US 2023/0081254 A1   Mar. 16, 2023

(51) Int. Cl.
*G11B 5/48* (2006.01)
*G01B 3/1094* (2020.01)
*G11B 5/584* (2006.01)

(52) U.S. Cl.
CPC .......... *G11B 5/4893* (2013.01); *G01B 3/1094* (2020.01); *G11B 5/584* (2013.01); *G11B 2220/90* (2013.01)

(58) Field of Classification Search
None
See application file for complete search history.

(56) References Cited

U.S. PATENT DOCUMENTS

| 5,276,577 | A | * | 1/1994 | Brooks et al. | ..... G11B 33/1446 360/99.18 |
| 5,465,186 | A | | 11/1995 | Bajorek et al. | |
| 6,002,589 | A | * | 12/1999 | Perino et al. | ....... H01L 23/4985 361/720 |
| 6,219,202 | B1 | | 4/2001 | Palmer | |
| 9,466,334 | B1 | | 10/2016 | Biskeborn et al. | |
| 2002/0109944 | A1 | | 8/2002 | Maruyama et al. | |
| 2009/0081833 | A1 | * | 3/2009 | Chung-Long-Shan et al. | ............. H01L 23/3157 257/E21.502 |
| 2009/0135569 | A1 | * | 5/2009 | Williams et al. | ... H01L 23/3157 361/772 |
| 2016/0358965 | A1 | * | 12/2016 | Suyama et al. | ..... H01L 31/0203 |

(Continued)

FOREIGN PATENT DOCUMENTS

CN   1299128 A   6/2001
CN   1822099 A   8/2006

OTHER PUBLICATIONS

International Search Report and Written Opinion from PCT Application No. PCT/CN2022/118685, dated Nov. 25, 2022.

*Primary Examiner* — Craig A. Renner
(74) *Attorney, Agent, or Firm* — Zilka-Kotab, P.C.

(57) ABSTRACT

An apparatus includes a beam, a chip coupled to the beam, a cable coupled to the beam by a first material located at opposite edges of the cable, and wire bonds extending from pads of the cable to pads of the chip. An apparatus includes a beam and a chip coupled to the beam. The chip includes an array of magnetic transducers for transducing data on a magnetic recording tape. The apparatus includes a cable coupled to the beam by a first material located at opposite edges of the cable, wire bonds extending from pads of the cable to pads of the chip, and a second material encapsulating ends of the wire bonds that are located adjacent the cable. The second material does not contact the chip.

20 Claims, 14 Drawing Sheets

(56) References Cited

U.S. PATENT DOCUMENTS

| | | |
|---|---|---|
| 2020/0066300 A1 | 2/2020 | Biskeborn |
| 2020/0143831 A1 | 5/2020 | Judd et al. |
| 2021/0074323 A1 | 3/2021 | Harper |
| 2022/0057256 A1* | 2/2022 | Shirao et al. ....... H01L 31/0203 |

* cited by examiner

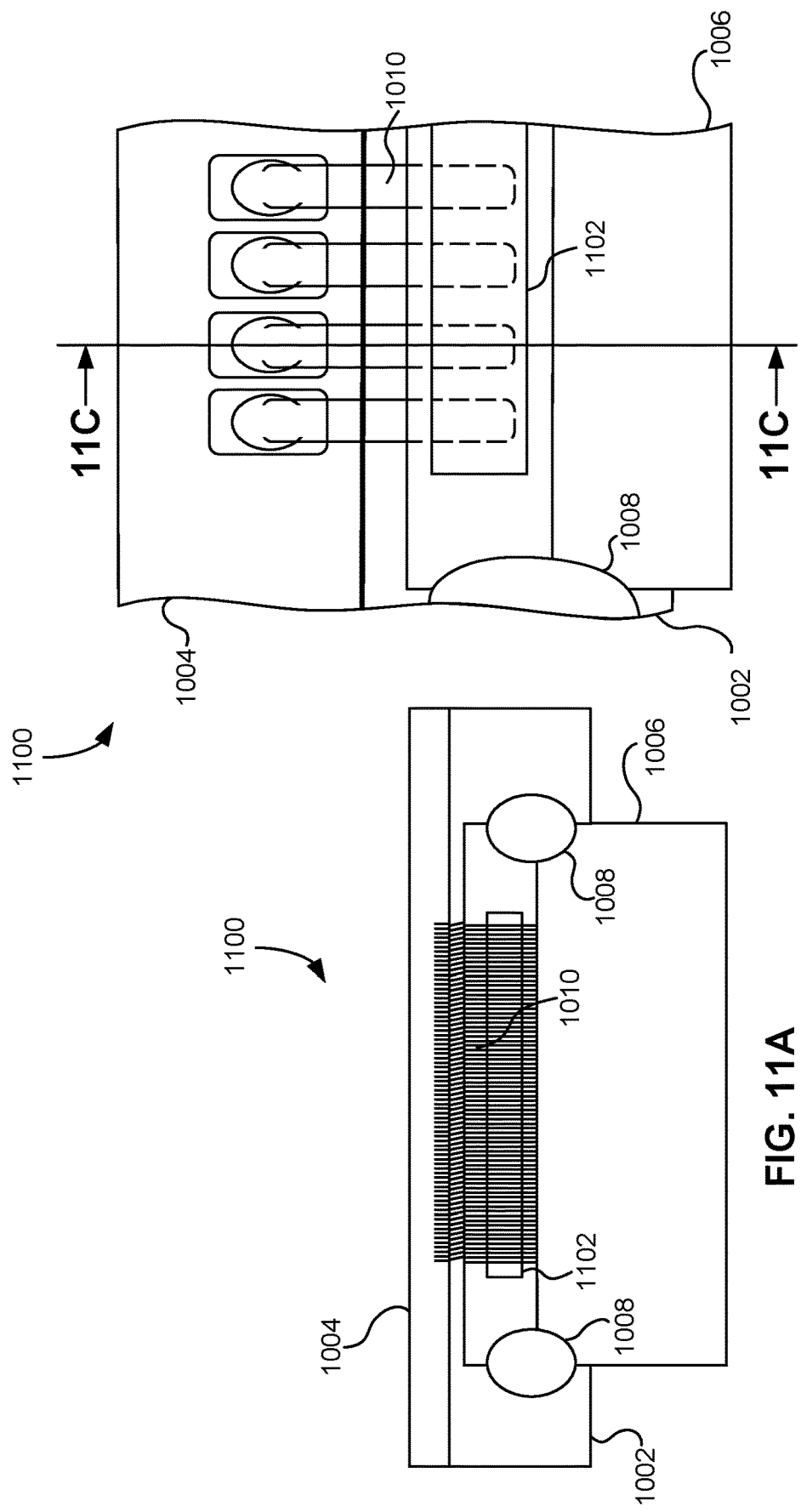

CABLE BONDING PROTECTION FOR HEAD DIMENSIONAL STABILITY

BACKGROUND

The present invention relates to data storage systems, and more particularly, this invention relates to cable bonding protection for head dimensional stability.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

An apparatus, according to one embodiment, includes a beam, a chip coupled to the beam, a cable coupled to the beam by a first material located at opposite edges of the cable, and wire bonds extending from pads of the cable to pads of the chip.

An apparatus, according to one embodiment, includes a beam and a chip coupled to the beam. The chip includes an array of magnetic transducers for transducing data on a magnetic recording tape. The apparatus includes a cable coupled to the beam by a first material located at opposite edges of the cable, wire bonds extending from pads of the cable to pads of the chip, and a second material encapsulating ends of the wire bonds that are located adjacent the cable. The second material does not contact the chip.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 11A-11C depict side, detailed, and cross-sectional views of an apparatus, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a beam, a chip coupled to the beam, a cable coupled to the beam by a first material located at opposite edges of the cable, and wire bonds extending from pads of the cable to pads of the chip.

In another general embodiment, an apparatus includes a beam and a chip coupled to the beam. The chip includes an array of magnetic transducers for transducing data on a magnetic recording tape. The apparatus includes a cable coupled to the beam by a first material located at opposite edges of the cable, wire bonds extending from pads of the cable to pads of the chip, and a second material encapsulating ends of the wire bonds that are located adjacent the cable. The second material does not contact the chip.

Figure 1A:
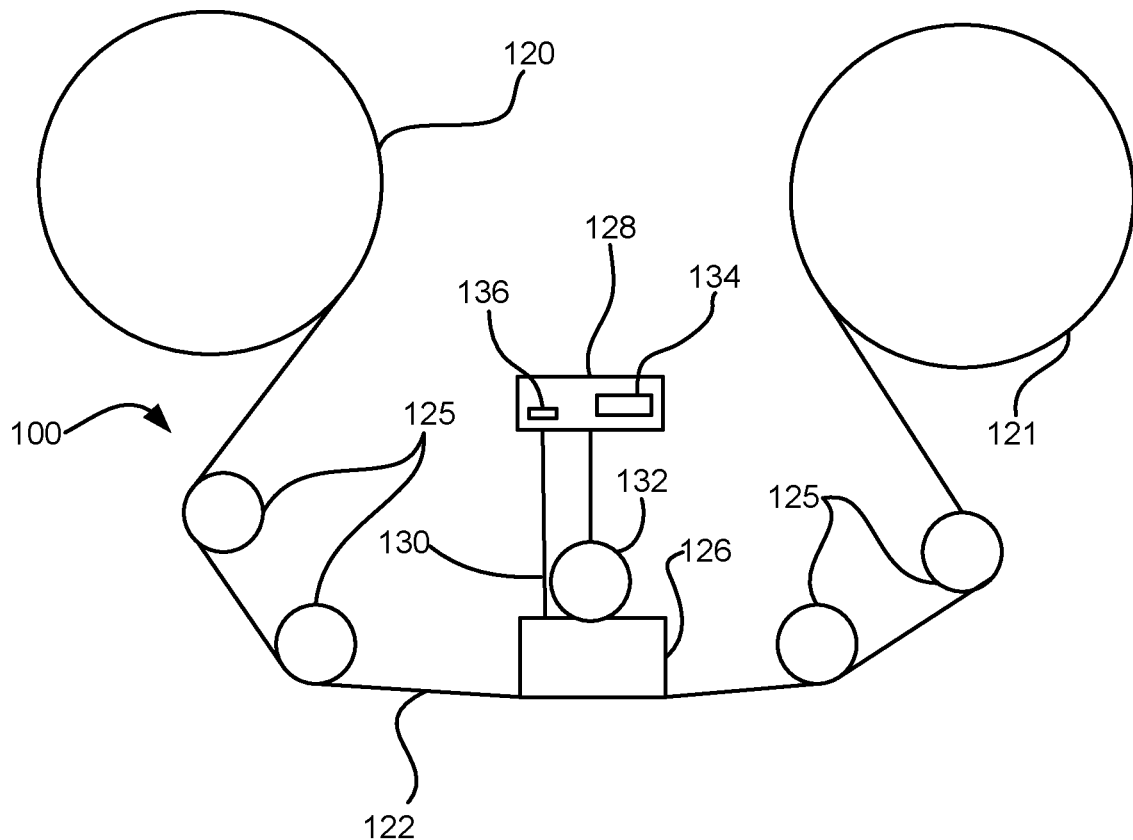
FIG. 1A is a schematic diagram of a simplified tape drive system, in accordance with one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
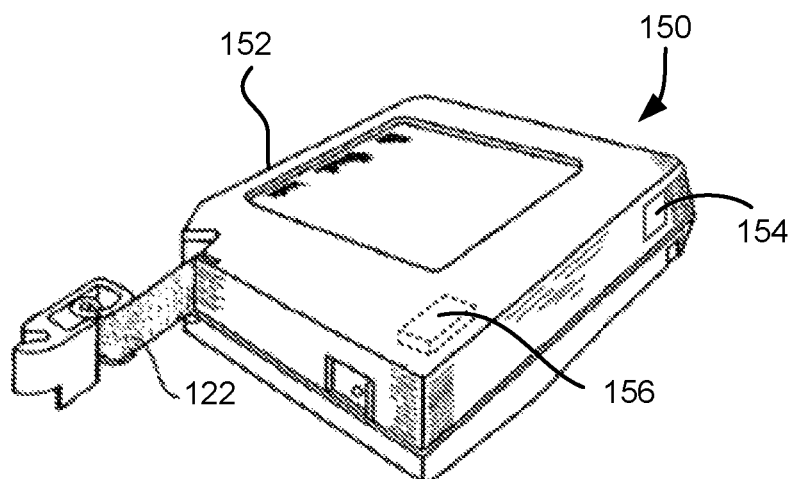
FIG. 1B is a schematic diagram of a tape cartridge, in accordance with one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
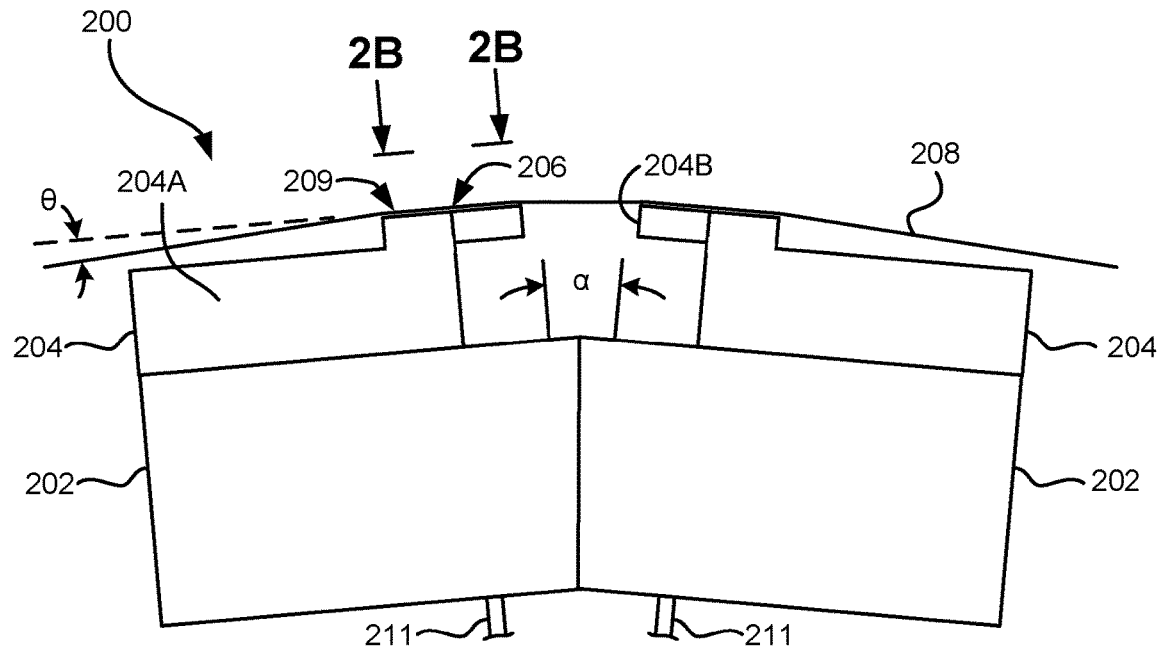
FIG. 2A illustrates a side view of a flat-lapped, bi-directional, two-module magnetic tape head, in accordance with one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 211 are provided for enabling communication between the controller and the transducers 206 of each of the modules 204. Pads on a cable 211 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
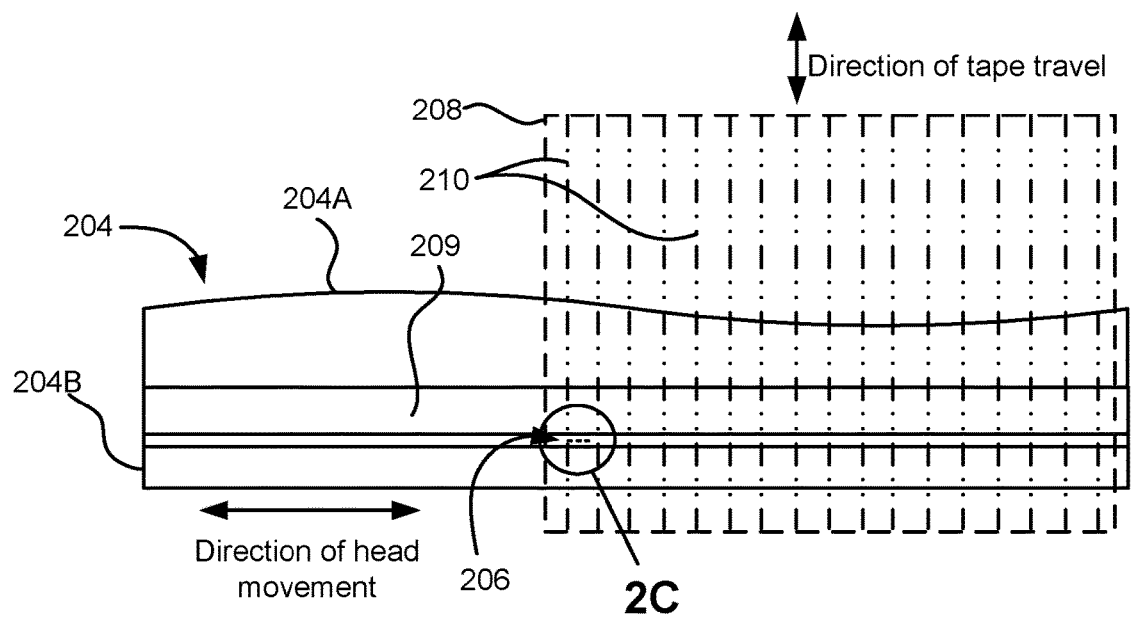
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
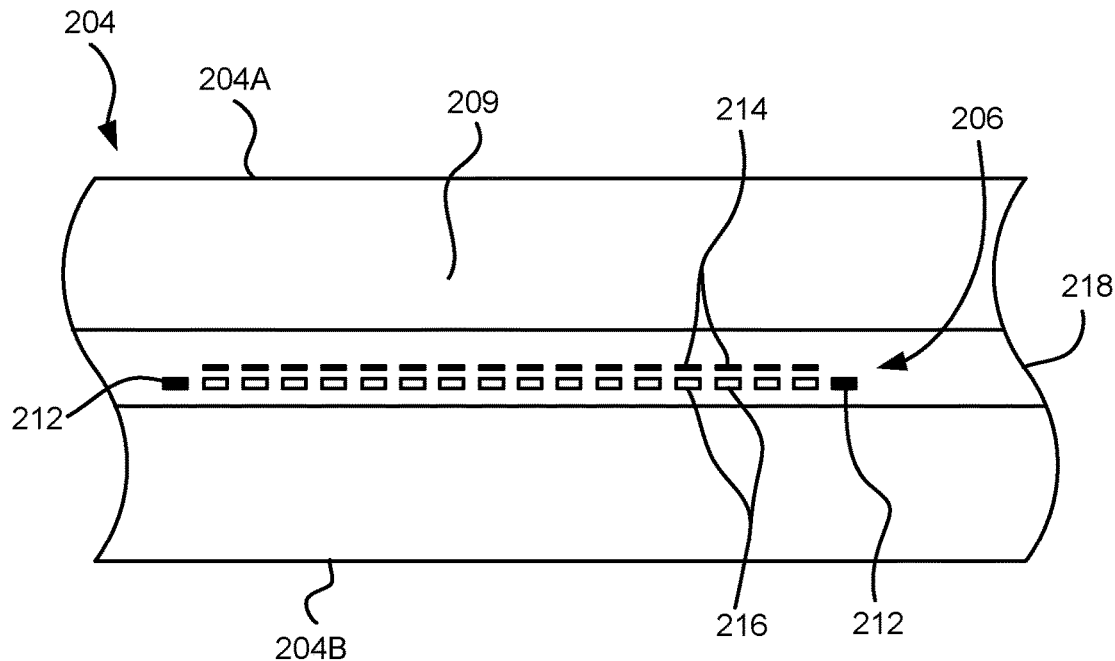
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
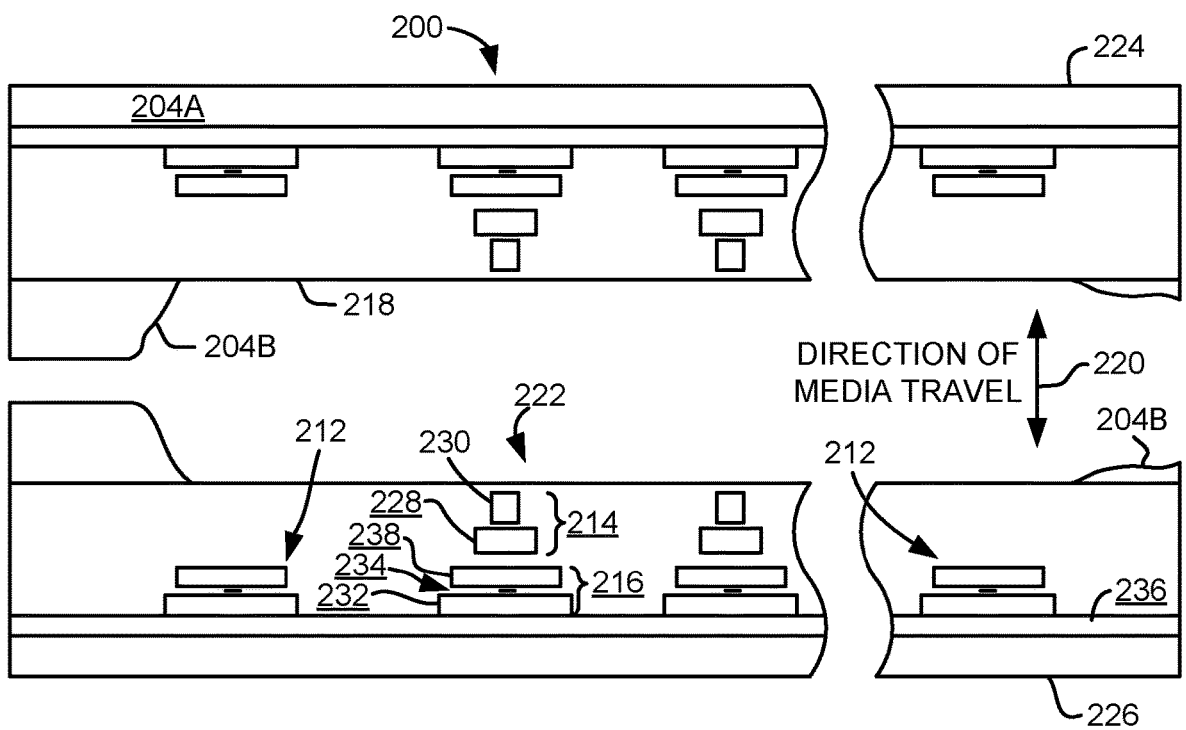
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
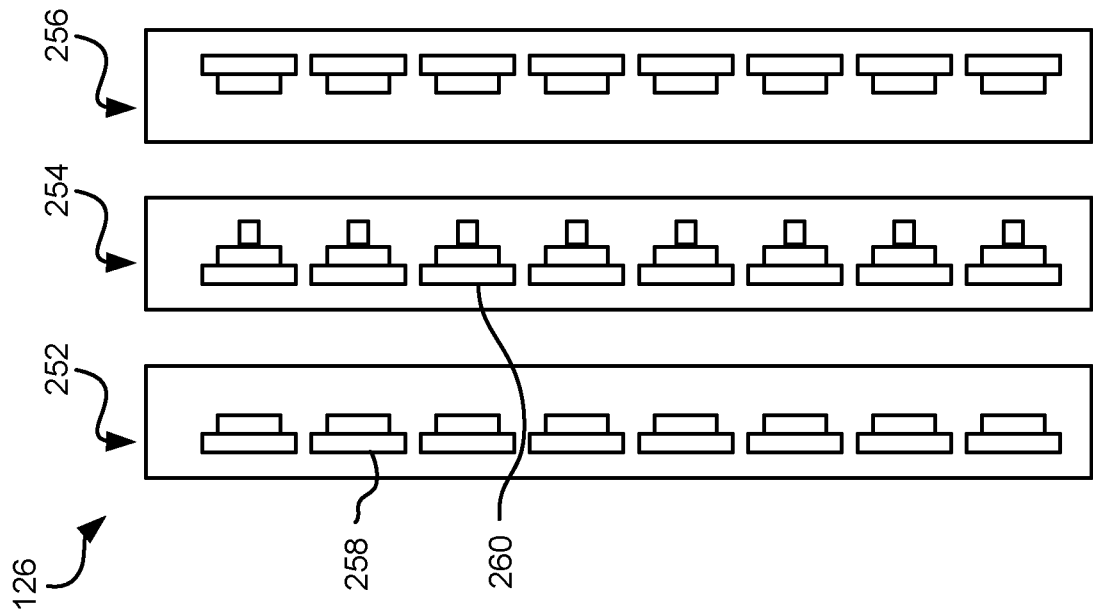
FIG. 4 is a partial tape bearing surface view of a magnetic head having a read-write-read configuration, in accordance with one embodiment.
Figure 3:
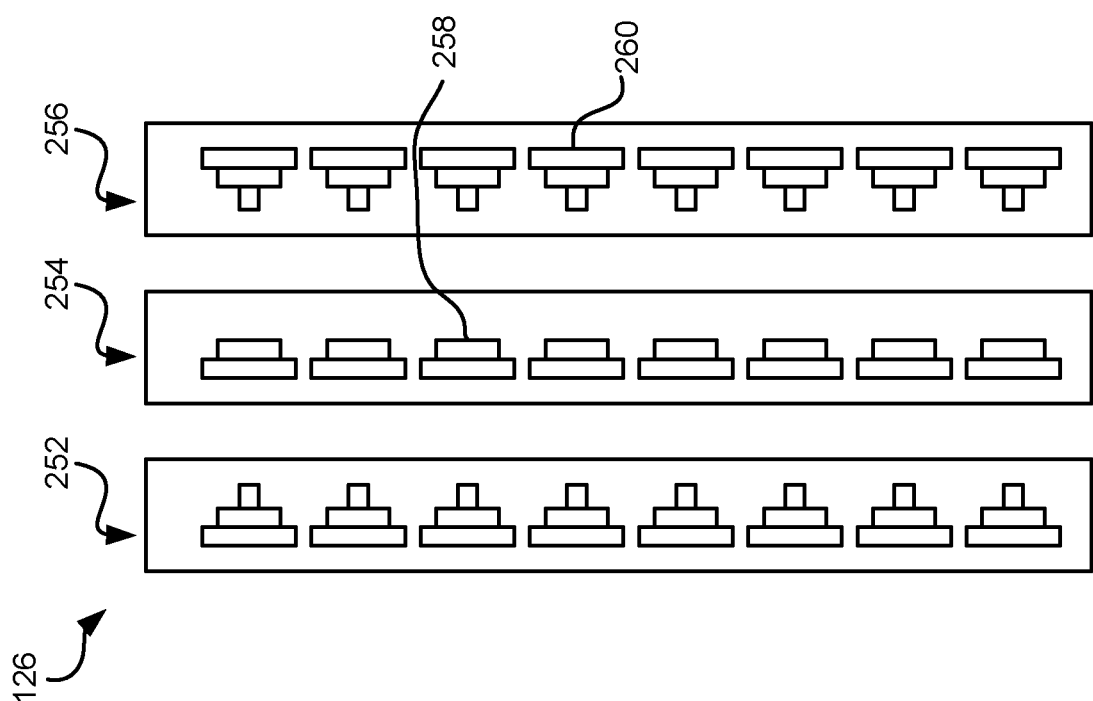
FIG. 3 is a partial tape bearing surface view of a magnetic head having a write-read-write configuration, in accordance with one embodiment.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
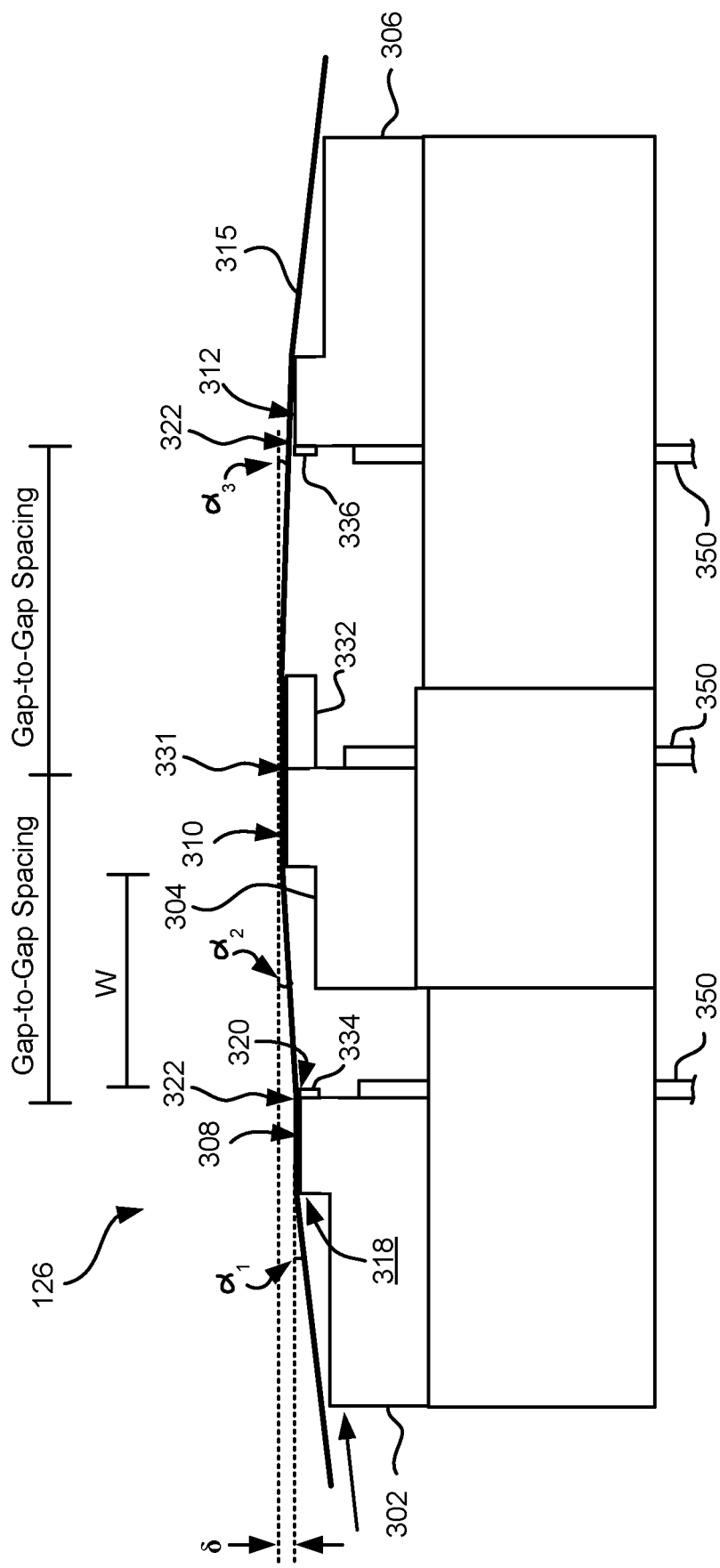
FIG. 5 is a side view of a magnetic tape head with three modules according to one embodiment where the modules all generally lie along about parallel planes, in accordance with one embodiment.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
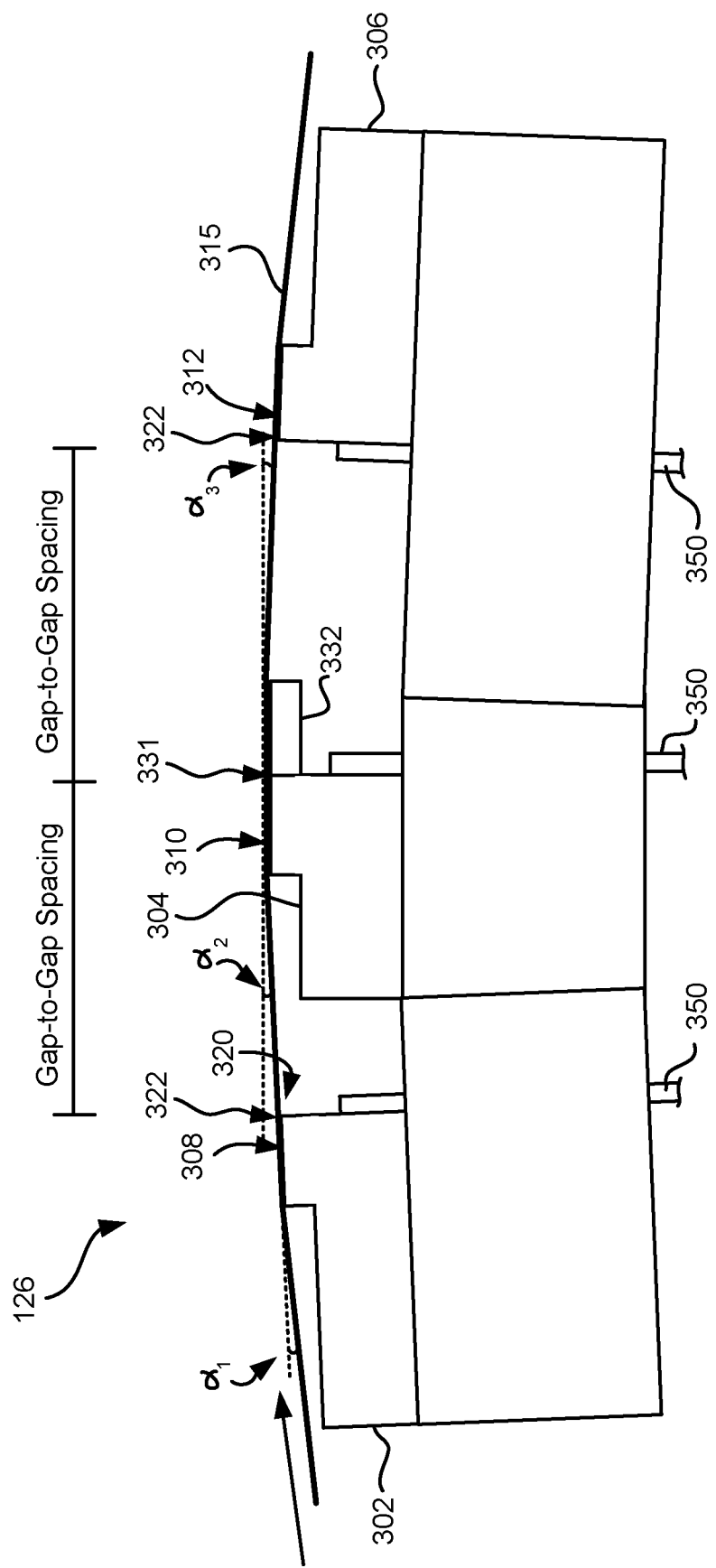
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
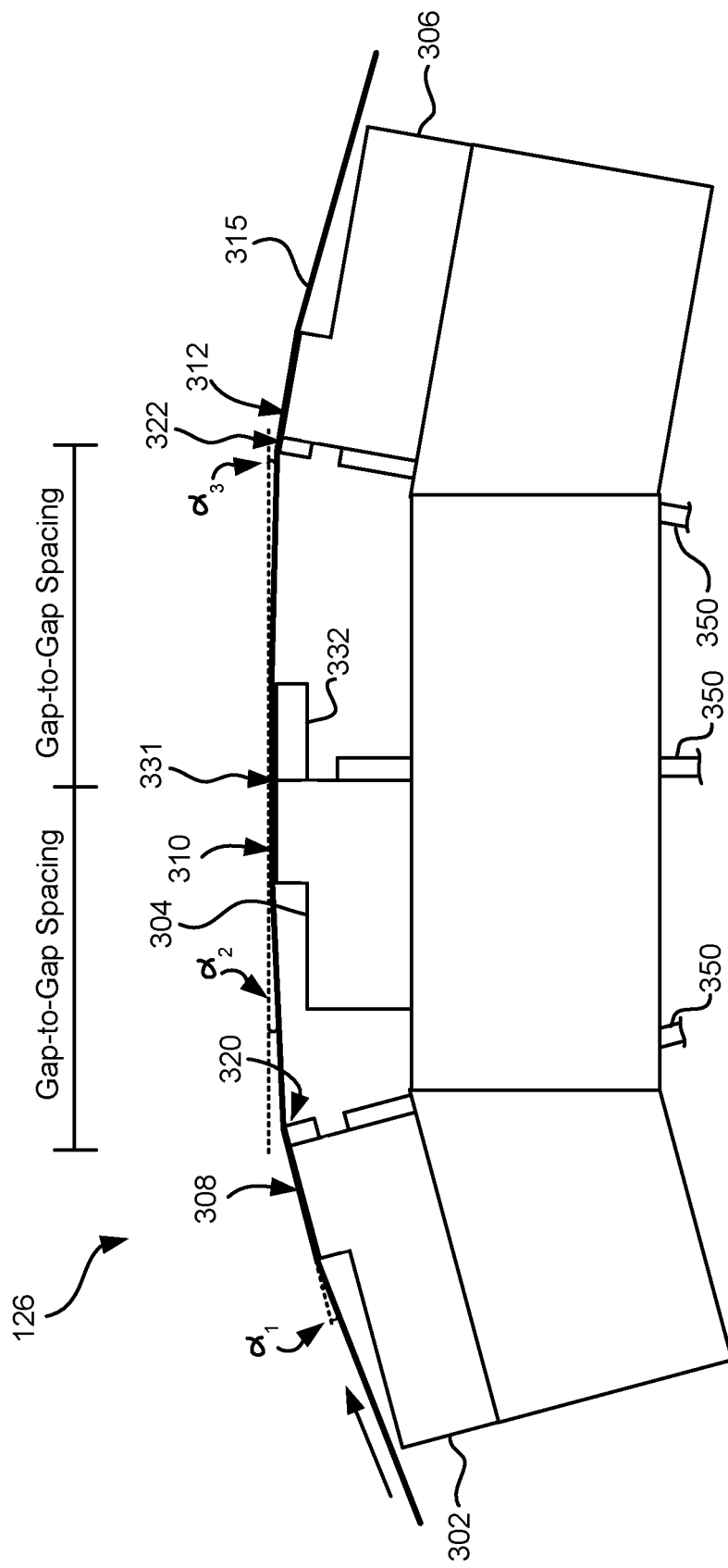
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading.

Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
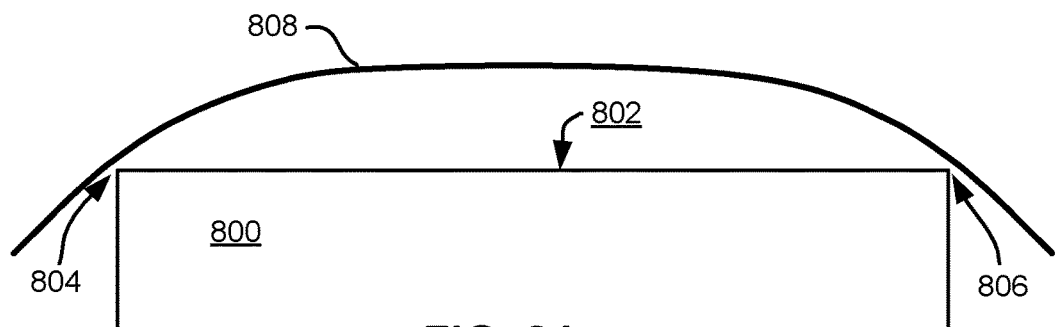
FIGS. 8A-8C are schematics depicting the principles of tape tenting.
Figure 8B:
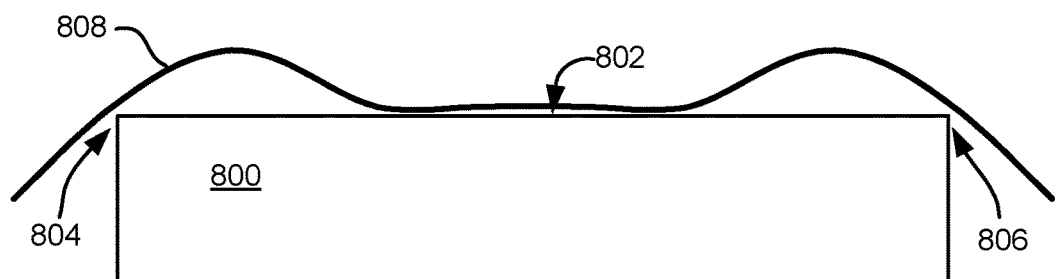
Figure 8C:
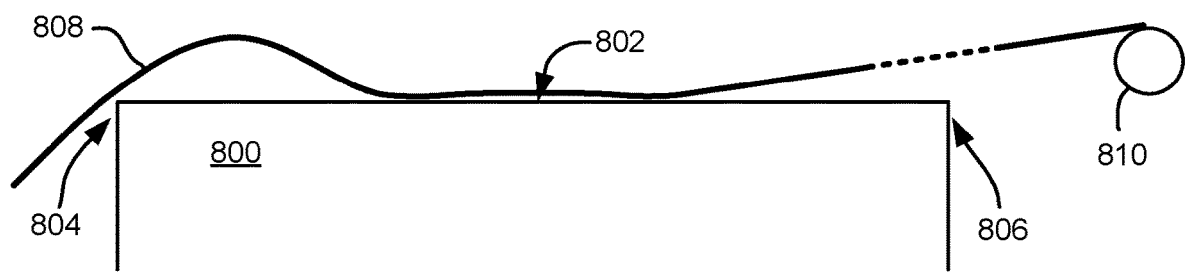

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge, and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM—based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
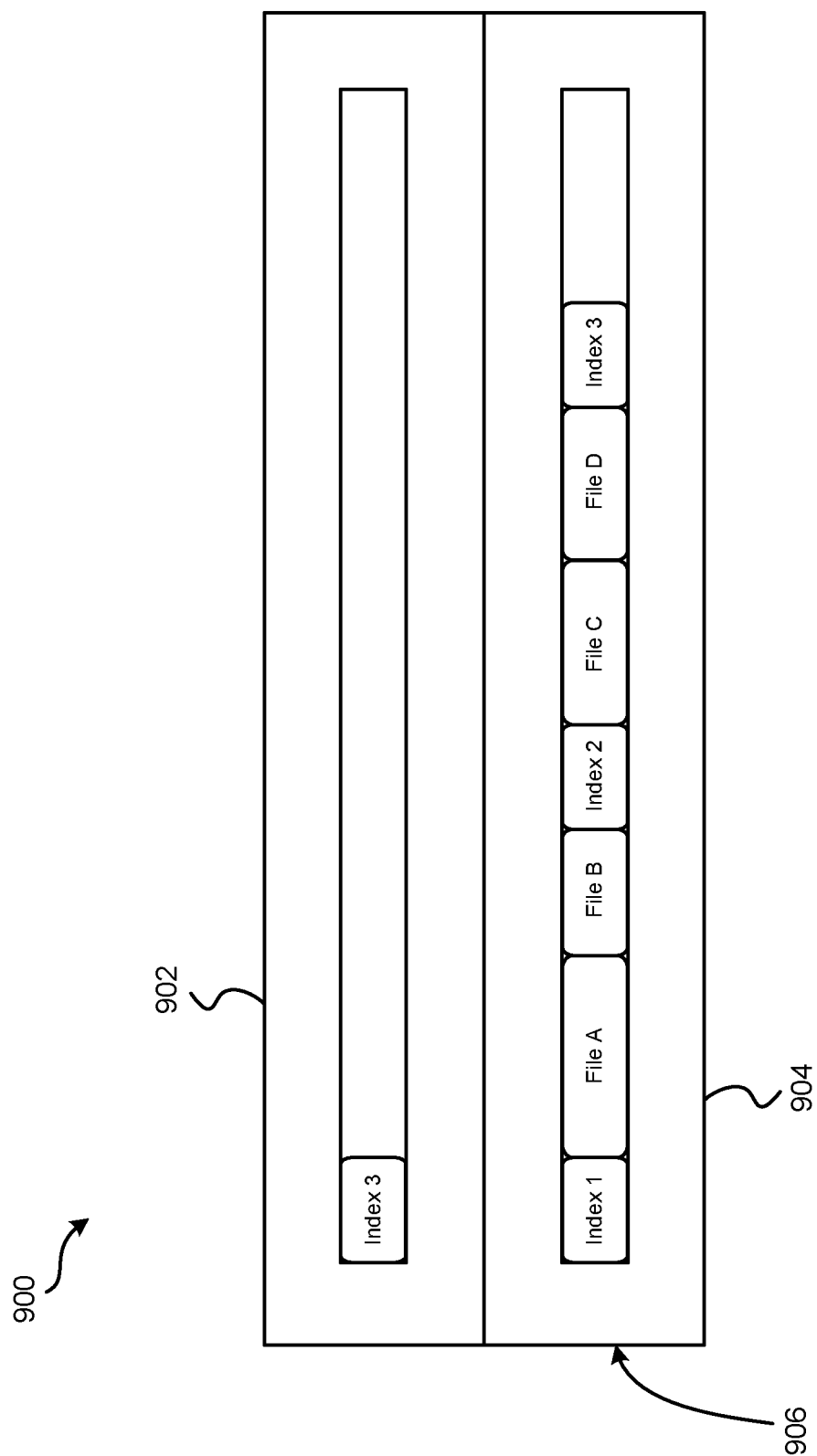
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

To compensate for tape dimensional stability (TDS), the head typically must be within a certain dimensional specification. For example, some current product designs allow a tolerance of +/−200 nm for transducer spans. If the head is too expanded or too contracted, e.g., beyond the tolerance, the drive may not be able to read from or write to certain tapes. Experimental data has shown that a significant factor in the variance of the head dimension from head to head is the cable bonding process. In particular, the strain relief protection applied to the wire bonds contributes significantly to the variance of head dimension. The strain relief shrinks as it is cured and, typically, the strain relief's contact with the head results in contraction of the head dimension. Alternative strain relief formulas have not been able to address these shrinkage issues either by reducing or eliminating the shrinkage. Moreover, reducing the amount of strain relief reduces the amount of protection for the wire bonds, and therefore this has not been an option. For example, yield losses from reducing the amount of strain relief increase from less than about 1% when conventional strain relief is used to about 20% yield loss when strain relief is reduced. Accordingly, one having ordinary skill in the art would expect that a reduction in strain relief-related material would result in increasing yield losses. There exists a need for a solution which sufficiently protects the cable bonds while minimizing the effects on head dimensional stability.

At least some of the aspects of the present disclosure reduce or eliminate shrinkage of the head dimension. Strain relief and strain relief material, as used throughout the present disclosure, may refer to any material conventionally used to protect wire bonds. For example, strain relief materials may include various known types of ultraviolet (UV) cured epoxy, two-part epoxides, acrylates, etc. In preferred approaches, the strain relief material has a high viscosity; e.g., does not significantly deform after application thereof; preferably exhibits low shrinkage upon being cured, e.g., does not change volume by more than 20%, more preferably 10%, ideally 5%; and also preferably has a low coefficient of thermal expansion, e.g., does not change volume by more than 20%, more preferably 10%, ideally 5% under the highest expected temperature conditions during use, as would be determinable by one having ordinary skill in the art upon reading the present disclosure.

A protection mechanism for cable bonding which protects the wire bonds and minimizes head span variation is described in at least some of the aspects of the present disclosure. In at least one exemplary aspect, in contrast to conventional encapsulation of the entire wire bond area in strain relief, at least two portions of strain relief (e.g., "dot" formations comprising strain relief) are applied at the edges of a cable to provide protection from stress to the wire bonds due to cable twisting and/or flexing, as well as couple the cable to the underlying structure. In another exemplary aspect, an encapsulation is created at the bottom ends of the wire bonds with strain relief at the cable end only. The strain relief may be applied such that a ledge is created which protrudes above the loop of the wire bonds, thereby providing protection against mechanical damage from handling (e.g., with tweezers, etc.) and/or operation of the device. In a further exemplary aspect, an optional cable stabilization process comprising adding strain relief to the back of the module further reduces cable movement and bending stresses to the wire bonds.

Head span variations have been significantly reduced using at least some of the approaches described herein. This is a significant benefit, especially in view of the desire to further reduce track density on tape. Moreover, at least some of the aspects described herein surprisingly resulted in reducing yield losses of about 20% to about 0%, despite the overall reduction in strain relief material applied to the apparatus. As noted above, this was not expected. Accordingly, various aspects described herein proceeded contrary to conventional wisdom.

Figure 10B:
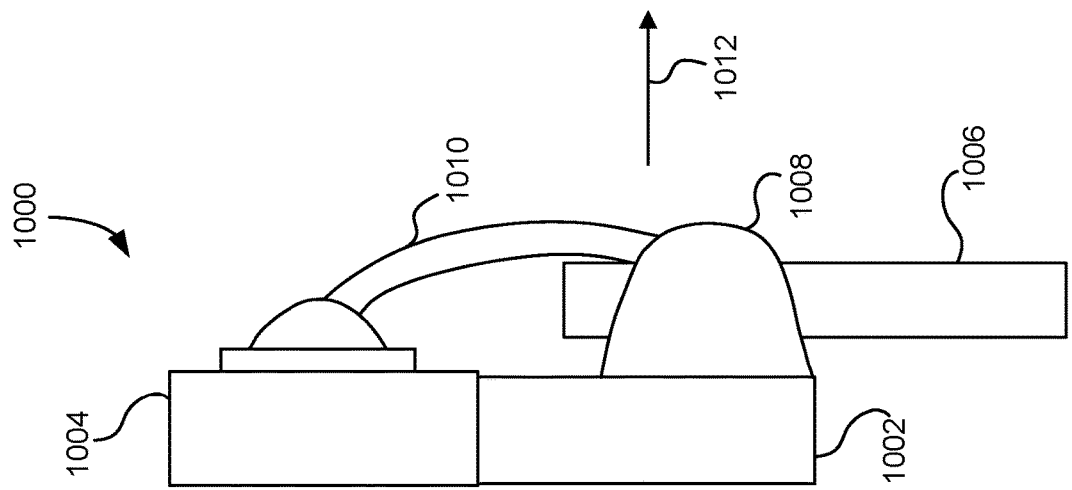
FIG. 10B is a cross-sectional view of the apparatus of FIG. 10A taken along line 10B-10B.
Figure 10A:
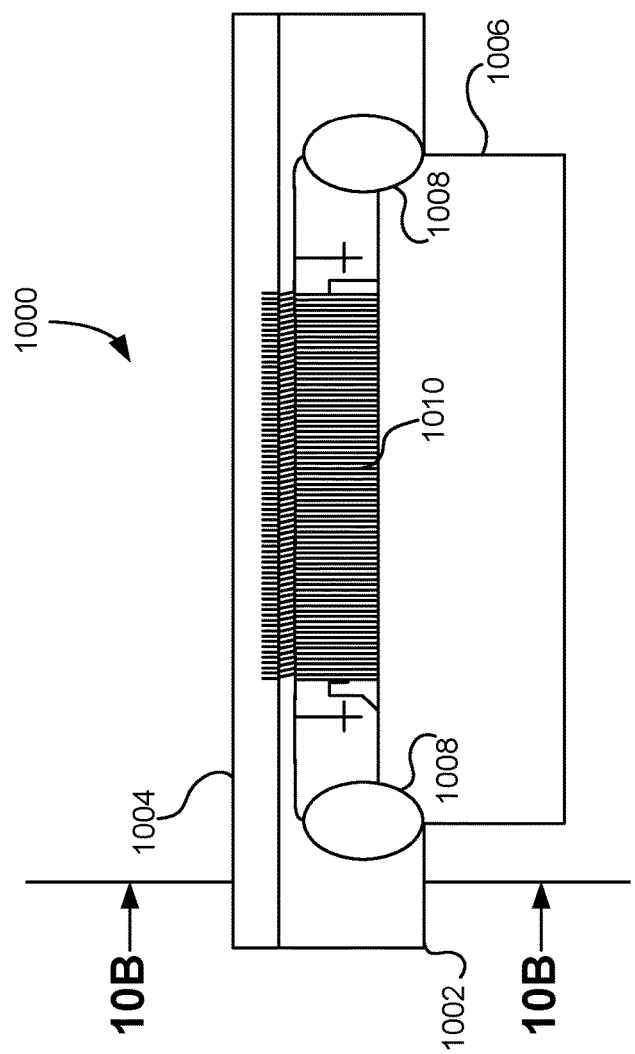
FIG. 10A is a side view of an apparatus, in accordance with one embodiment.

FIGS. 10A-10B depict an apparatus 1000, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

As shown, apparatus 1000 includes a beam 1002 and a chip 1004 coupled to the beam 1002. The apparatus 1000 includes a cable 1006 coupled to the beam 1002 by a first material 1008 located at opposite edges of the cable 1006 as shown in FIG. 10A. The apparatus 1000 comprises wire bonds 1010 extending from pads of the cable 1006 to pads of the chip 1004.

In a preferred aspect, the first material 1008 is located at opposite edges of the cable 1006 in at least two "dot" formations (e.g., with one dot at each edge of the cable 1006). For example, the first material 1008 may be applied as two lateral portions (e.g., the two dots). In some approaches, to provide protection to the wire bonds, the first material 1008 extends in an upward direction 1012 higher than a height of the wire bonds 1010. The first material preferably does not contact the wire bonds 1010.

In at least some approaches, the first material 1008 includes a strain relief material. In a preferred aspect, the first material 1008 is a UV-cured epoxy. The beam 1002, chip 1004, and cable 1006 may comprise any combination of materials known in the art and/or described in detail above. Moreover, the beam 1002, chip 1004, and cable 1006 may be of conventional design.

In various preferred aspects, the chip 1004 includes an array of magnetic transducers for transducing data on a magnetic recording tape, according to at least some of the aspects described herein and known in the art.

In various aspects, an apparatus 1000 may further comprise a drive mechanism (not shown) for passing a magnetic medium (e.g., tape) over the chip 1004 and a controller (not shown) electronically coupled to the cable 1006, in a manner that would become apparent to one having ordinary skill in the art upon reading the present disclosure.

Figure 11C:
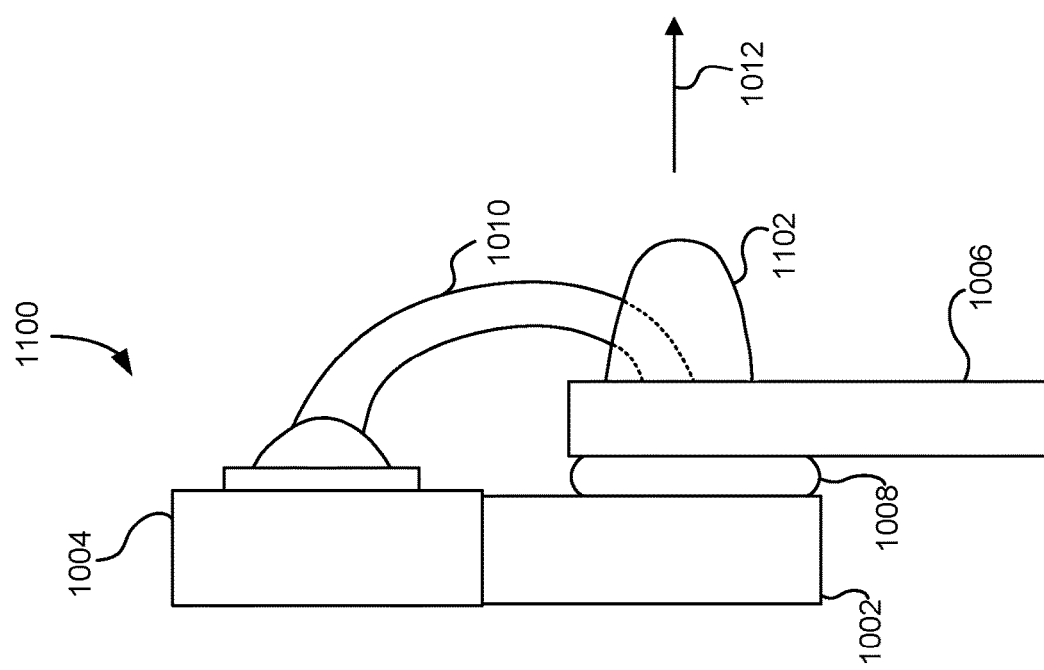

Looking to FIGS. 11A-11C, an apparatus 1100 is depicted in accordance with another embodiment. As an option, the present apparatus 1100 may be implemented in conjunction with features from any other embodiment listed herein, such as those described with reference to the other FIGS., such as FIG. 10A-10B. Specifically, FIGS. 11A-11C illustrate variations of the embodiment of FIGS. 10A-10B depicting several exemplary configurations of an apparatus 1100. Accordingly, various components of FIGS. 11A-11C have common numbering with those of FIGS. 10A-10B.

Note that such apparatus 1100 and others presented herein may be used in various applications and/or in permutations which may or may not be specifically described in the illustrative embodiments listed herein. Further, the apparatus 1100 presented herein may be used in any desired environment. Thus FIGS. 11A-11C (and the other FIGS.) may be deemed to include any possible permutation.

Apparatus 1100 includes a second material 1102. The second material 1102 preferably encapsulates the ends of the wire bonds 1010 that are adjacent to the cable 1006. The second material 1102 does not contact the chip 1004.

In various aspects, the first material 1008 and the second material 1102 have the same composition. In other aspects, the first material 1008 and the second material 1102 comprise the same material. For example, in various aspects, the second material 1102 is a UV-cured epoxy of the same type as the first material 1008. In other approaches, the first material 1008 and the second material 1102 have different compositions. For example, the first material 1008 may include a UV-cured epoxy and the second material 1102 may include an acrylate, or vice versa.

In at least some aspects, the second material 1102 extends, in a direction 1012 perpendicular to the cable 1006, for a distance above the cable 1006 that is greater than a distance the wire bonds 1010 extend above the cable 1006 in the same direction. The second material 1102 preferably protrudes above the wire bonds 1010 (e.g., the wire bond loops) to protect the wire bonds 1010 from mechanical damage, as would become apparent to one having ordinary skill in the art upon reading the present disclosure. For example, the location of the second material 1102 preferably prevents various components from touching the wire bonds 1010 and the second material 1102 acts as a barrier against mechanical movement during operation of the apparatus 1100 as described herein.

In various aspects, an apparatus 1100 may further comprise a drive mechanism (not shown) for passing a magnetic medium over the chip 1004 and a controller (not shown) electronically coupled to the cable 1006.

Figure 12B:
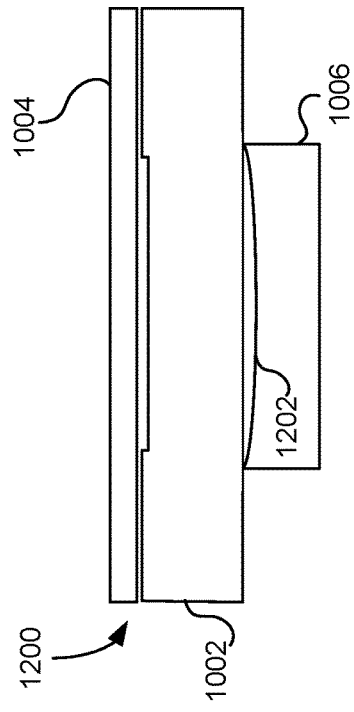
FIGS. 12B-12D depict alternate embodiments of the apparatus of FIG. 12A.
Figure 12C:
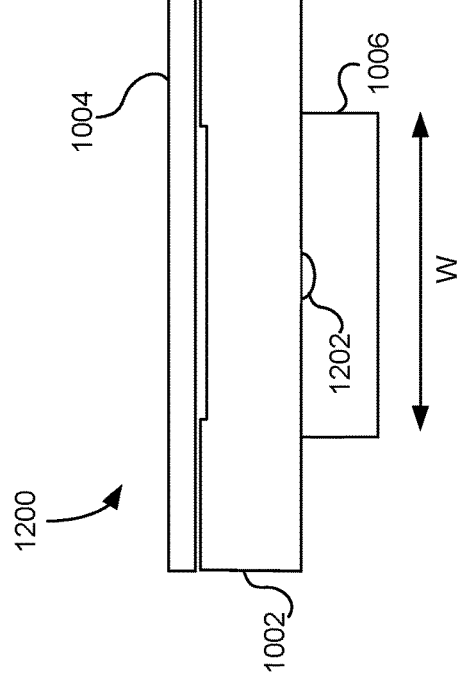
Figure 12A:
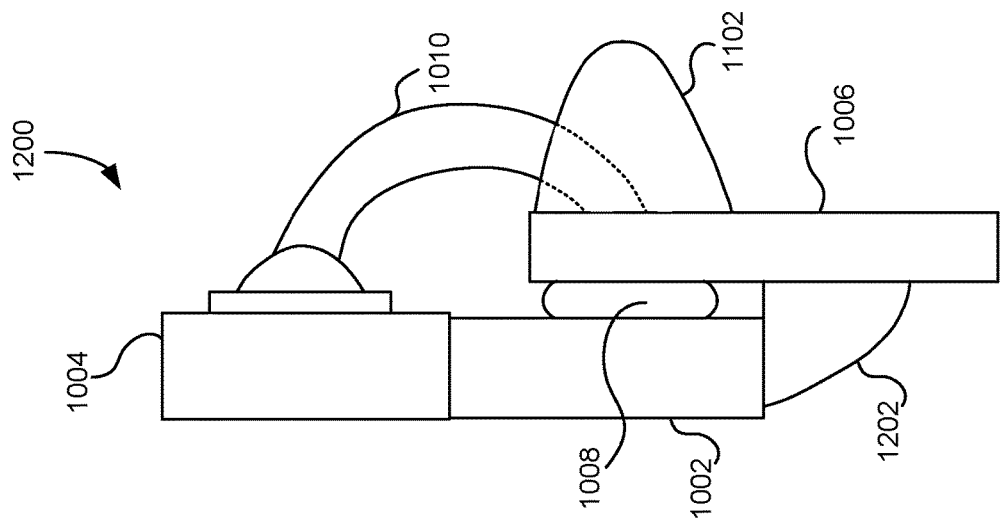
FIG. 12A depicts a side view of an apparatus, in accordance with one embodiment.

Looking to FIGS. 12A-12C, an apparatus 1200 is depicted in accordance with another embodiment. As an option, the present apparatus 1200 may be implemented in conjunction with features from any other embodiment listed herein, such as those described with reference to the other FIGS., such as FIGS. 10A-10B and FIGS. 11A-11C. Specifically, FIGS. 12A-12C illustrate variations of the embodiment of FIGS. 10A-10B depicting several exemplary configurations within an apparatus 1200. Accordingly, various components of FIGS. 12A-12C have common numbering with those of FIGS. 10A-10B and FIGS. 11A-11C.

Note that such apparatus 1200 and others presented herein may be used in various applications and/or in permutations which may or may not be specifically described in the illustrative embodiments listed herein. Further, the apparatus 1200 presented herein may be used in any desired environment. Thus FIGS. 12A-12C (and the other FIGS.) may be deemed to include any possible permutation.

Figure 12D:
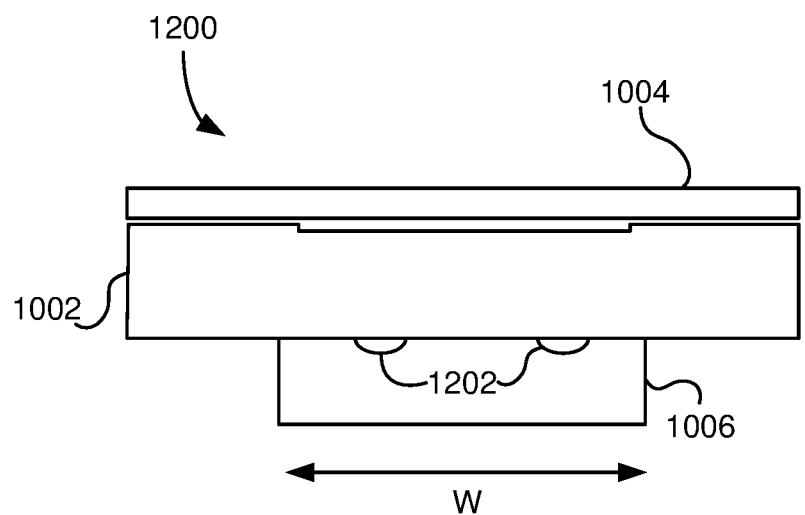

Apparatus 1200 comprises a third material 1202. The third material 1202 may be applied on the backside of the apparatus 1200 for coupling the cable 1006 to the beam 1002. The third material 1202 beneficially provides cable support and rigidity to the apparatus 1200. In various approaches, the third material 1202 may be applied in one section of the backside of the apparatus 1200 (as shown in FIGS. 12B-12C, in some aspects). In other approaches, the third material 1202 may be applied (e.g., the third material 1202 is present) in at least two separate sections e.g., as shown in FIG. 12D. For example, the at least two separate sections of the third material 1202 may be applied as dots, strips, rectangles, triangles, squares, ovals, etc., or any combination thereof, behind the cable 1006.

In various aspects, the third material 1202 includes a strain relief material as described elsewhere herein. In a preferred aspect, the third material 1202 is a UV-cured epoxy. Thus, in some approaches, the first material 1008, the second material 1102 (not shown in FIGS. 12A-12C), and the third material 1202 may all comprise UV-cured epoxy. The first material 1008, the second material 1102 (not shown in FIGS. 12A-12C), and the third material 1202 may comprise the same type of UV-cured epoxy or any combination of types of UV-cured epoxies known in the art. In various other approaches, the first material 1008, the second material 1102 (not shown in FIGS. 12A-12C), and the third material 1202 may each individually be any combination of strain relief materials described herein.

In at least one exemplary aspect, the third material 1202 extends along the beam 1002 and the cable 1006 between the opposite edges of the cable for coupling the cable 1006 to the beam 1002, as shown in FIG. 12B depicting the backside of the apparatus 1200. Specifically, the third material 1202 preferably extends along the beam 1002 and the cable 1006 for at least part of the distance between the opposite edges of the cable 1006 for also coupling the cable 1006 to the beam 1002, as shown in FIG. 12C depicting the backside of the apparatus 1200.

In one exemplary aspect, the third material 1202 extends along at least half (e.g., ½, 50%) of a width W of the cable 1006 as measured between the opposite edges thereof. In another exemplary aspect, the third material extends along at least 80% of the width of the cable 1006. In at least one other exemplary aspect, the third material 1202 extends along no more than one fourth (e.g., ¼, 25%) of a width of the cable 1006 as measured between the opposite edges thereof. For example, the third material 1202 may be applied to the center of the backside of the apparatus 1200, e.g., as shown in FIG. 12C.

In various aspects, an apparatus 1200 may further comprise a drive mechanism (not shown) for passing a magnetic medium over the chip 1004 and a controller (not shown) electronically coupled to the cable 1006.

In at least one aspect, the first material 1008 may be applied to at least two sections as shown in FIG. 10B and the third material 1202 may be applied to the backside of the apparatus in any manner described herein, e.g., with reference to FIGS. 12A-12C, but no second material 1102 is applied in this exemplary aspect. In this exemplary aspect, the wire bonds 1010 may be exposed. The inventors were surprised to discover that, though no second material is present, the wired bonds beneficially do not get pulled by the mechanical processes involved in operation of the apparatus. The first material 1008 and the third material 1202 surprisingly provide sufficient support and rigidity to prevent mechanical damage, even while reducing the total volume of strain relief material, contrary to conventional wisdom.

Any of the materials described herein (e.g., the first material 1008, the second material 1102, the third material 1202, etc.) may be applied in any manner that would become apparent to one skilled in the art upon reading the present disclosure. In various exemplary approaches, one or more of the materials may be applied manually using a syringe, in an automated manner, etc., in a manner known in the art, or any combination thereof. In preferred aspects, the materials are applied in a manner that controls the dimensions and/or volume of the material(s) such that the material(s) do not overflow into notches of the apparatus, onto the chip, and/or into other unwanted areas, as would be determinable by one having ordinary skill in the art upon reading the present disclosure. Furthermore, in preferred aspects, each material may be applied such that a "peak" of each formation is higher than at least the wire bonds of the apparatus.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a beam;
    a chip coupled to the beam, wherein the chip includes at least one magnetic transducer;
    a cable coupled to the beam by a first material located at opposite edges of the cable; and
    wire bonds extending from pads of the cable to pads of the chip.

2. An apparatus as recited in claim 1, wherein the at least one magnetic transducer includes an array of magnetic transducers and is configured for transducing data on a magnetic recording tape.

3. An apparatus as recited in claim 1, comprising a second material encapsulating ends of the wire bonds that are located adjacent the cable, wherein the second material does not contact the chip.

4. An apparatus as recited in claim 3, wherein the first and second materials have the same composition.

5. An apparatus as recited in claim 3, wherein the second material is a UV-cured epoxy.

6. An apparatus as recited in claim 3, comprising a third material extending along the beam and the cable between the opposite edges of the cable for coupling the cable to the beam.

7. An apparatus as recited in claim 6, wherein the third material extends along at least ½ of a width of the cable as measured between the opposite edges thereof.

8. An apparatus as recited in claim 7, wherein the third material extends along at least 80% of the width of the cable.

9. An apparatus as recited in claim 6, wherein the third material extends along no more than ¼ of a width of the cable as measured between the opposite edges thereof.

10. An apparatus as recited in claim 6, wherein the third material is present in at least two separate sections.

11. An apparatus as recited in claim 1, wherein the first material is a UV-cured epoxy.

12. An apparatus as recited in claim 1, further comprising:
    a drive mechanism for passing a magnetic medium over the chip; and
    a controller electrically coupled to the cable.

13. An apparatus, comprising:
    a beam;
    a chip coupled to the beam;
    a cable coupled to the beam by a first material located at opposite edges of the cable; and
    wire bonds extending from pads of the cable to pads of the chip;
    a second material encapsulating ends of the wire bonds that are located adjacent the cable,
    wherein the second material extends for a distance above the cable in a direction perpendicular to the cable that is greater than a distance the wire bonds extend above the cable in the same direction.

14. An apparatus, comprising:
    a beam;
    a chip coupled to the beam, wherein the chip includes an array of magnetic transducers for transducing data on a magnetic recording tape;

a cable coupled to the beam by a first material located at opposite edges of the cable;

wire bonds extending from pads of the cable to pads of the chip; and a second material encapsulating ends of the wire bonds that are located adjacent the cable, wherein the second material does not contact the chip.

15. An apparatus as recited in claim 14, wherein the first and second materials have the same composition.

16. An apparatus as recited in claim 14, wherein the second material extends for a distance above the cable in a direction perpendicular to the cable that is greater than a distance the wire bonds extend above the cable in the same direction.

17. An apparatus as recited in claim 14, comprising a third material extending along the beam and the cable between the opposite edges of the cable for coupling the cable to the beam.

18. An apparatus as recited in claim 17, wherein the third material extends along at least ½ of a width of the cable as measured between the opposite edges thereof.

19. An apparatus as recited in claim 17, wherein the third material extends along no more than ¼ of a width of the cable as measured between the opposite edges thereof.

20. An apparatus as recited in claim 14, further comprising:

a drive mechanism for passing a magnetic medium over the chip; and a controller electrically coupled to the cable.

* * * * *